US012567195B2

(12) United States Patent
Liu

(10) Patent No.: US 12,567,195 B2
(45) Date of Patent: Mar. 3, 2026

(54) HAIR MODEL RENDERING METHOD AND APPARATUS, ELECTRONIC DEVICE, AND STORAGE MEDIUM

(71) Applicant: NetEase (Hangzhou) Network Co., Ltd., Zhejiang (CN)

(72) Inventor: Zhongyuan Liu, Zhejiang (CN)

(73) Assignee: NetEase (Hangzhou) Network Co., Ltd., Zhejiang (CN)

( * ) Notice: Subject to any disclaimer, the term of this patent is extended or adjusted under 35 U.S.C. 154(b) by 201 days.

(21) Appl. No.: 18/262,008

(22) PCT Filed: Apr. 21, 2022

(86) PCT No.: PCT/CN2022/088240
§ 371 (c)(1),
(2) Date: Jul. 18, 2023

(87) PCT Pub. No.: WO2023/040262
PCT Pub. Date: Mar. 23, 2023

(65) Prior Publication Data
US 2024/0078736 A1      Mar. 7, 2024

(30) Foreign Application Priority Data
Sep. 16, 2021    (CN) .......................... 202111086459.4

(51) Int. Cl.
*G06T 15/00*          (2011.01)
(52) U.S. Cl.
CPC .................................. *G06T 15/005* (2013.01)
(58) Field of Classification Search
CPC ....... G06T 15/005; G06T 15/20; G06T 15/40;
G06T 13/40
See application file for complete search history.

(56) References Cited

U.S. PATENT DOCUMENTS 11,030,786 B1    6/2021  Bondich et al.
2008/0036782 A1*  2/2008  Bruderlin ................ G06T 13/40
345/581
(Continued)

FOREIGN PATENT DOCUMENTS

CN        112465942  A      3/2021
CN        112818663  A      5/2021
(Continued)

OTHER PUBLICATIONS

Written Opinion of the International Searching Authority of WO2023040262.
(Continued)

*Primary Examiner* — Michelle Chin
(74) *Attorney, Agent, or Firm* — Greenberg Traurig, LLP

(57) ABSTRACT

A hair model rendering method, including: obtaining hair data of hair model and storing hair data in video memory of graphics processor; configuring stream processor unit corresponding to each hairline data group; loading the current to-be-processed hair node data in corresponding hairline data and linked hair node data associated with to-be-processed hair node data, to register of graphics processor via thread; determining a set of parameter-node position solving algorithms corresponding to to-be-processed hair node data; solving position by the current node-position solving algorithm and corresponding parameter node; and saving hair node data corresponding to the current parameter node to video memory of graphics processor, when the current node-position solving algorithm completes position solving based on the current parameter node, and if the current parameter node does not belong to parameter node of other node-position algorithms or node-position solving algorithm group corresponding to other hair node data in hairline data.

19 Claims, 8 Drawing Sheets

(56) References Cited

U.S. PATENT DOCUMENTS

| | | | |
|---|---|---|---|
| 2019/0035133 A1* | 1/2019 | Jiao | G06T 7/251 |
| 2020/0279440 A1 | 9/2020 | Aluru et al. | |
| 2021/0133915 A1* | 5/2021 | Benthin | G06F 9/3877 |

FOREIGN PATENT DOCUMENTS

| | | | |
|---|---|---|---|
| CN | 113313802 A | 8/2021 | |
| CN | 113763521 A | 6/2023 | |
| JP | 2017026992 A | 2/2017 | |

OTHER PUBLICATIONS

International Search Report of WO2023040262.
First search of priority application CN202111086459.4.
English translation of ISR of WO2023040262.
English translations of cited foreign patent documents.

\* cited by examiner

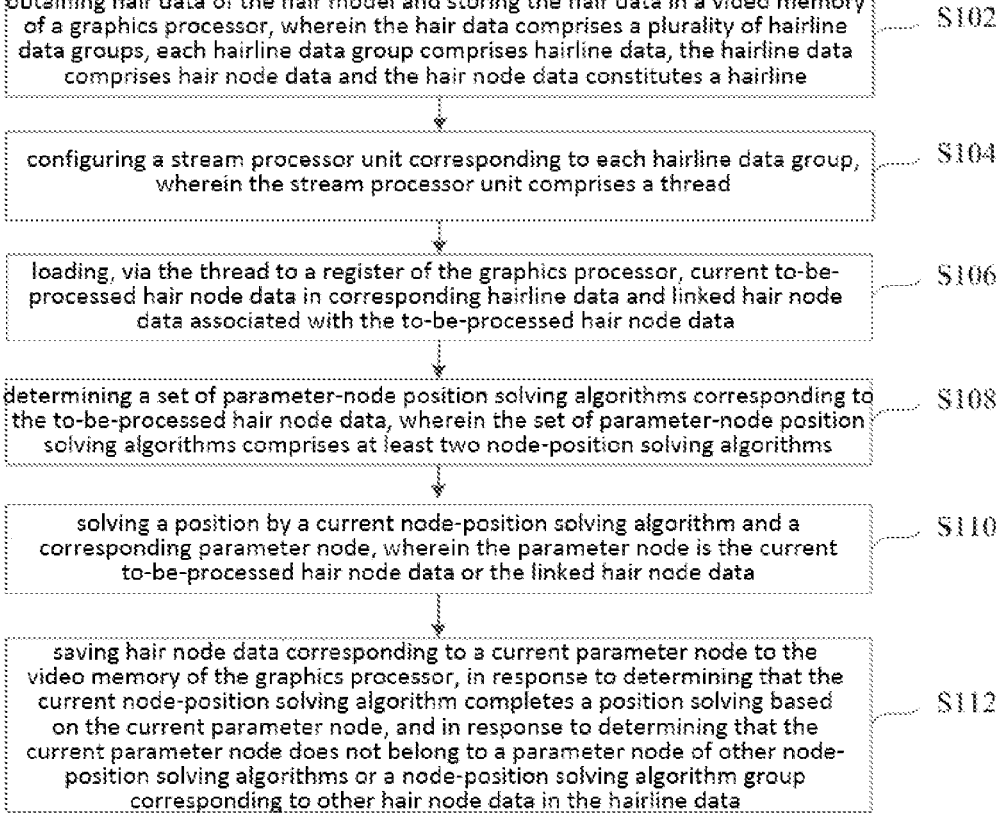

obtaining hair data of the hair model and storing the hair data in a video memory of a graphics processor, wherein the hair data comprises a plurality of hairline data groups, each hairline data group comprises hairline data, the hairline data comprises hair node data and the hair node data constitutes a hairline — S102 configuring a stream processor unit corresponding to each hairline data group, wherein the stream processor unit comprises a thread — S104 loading, via the thread to a register of the graphics processor, current to-be-processed hair node data in corresponding hairline data and linked hair node data associated with the to-be-processed hair node data — S106 determining a set of parameter-node position solving algorithms corresponding to the to-be-processed hair node data, wherein the set of parameter-node position solving algorithms comprises at least two node-position solving algorithms — S108 solving a position by a current node-position solving algorithm and a corresponding parameter node, wherein the parameter node is the current to-be-processed hair node data or the linked hair node data — S110 saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position solving algorithms or a node-position solving algorithm group corresponding to other hair node data in the hairline data — S112

FIG. 1

Headline

Head node

Data acquisition
module 702

Thread configuration
module 704

Data loading module
706

Algorithm group
determination module
708

Position solving
module 710

Data return module
712

HAIR MODEL RENDERING METHOD AND APPARATUS, ELECTRONIC DEVICE, AND STORAGE MEDIUM

CROSS-REFERENCE TO RELATED APPLICATIONS

The present application is the U.S. National Phase Application of International Application No. PCT/CN2022/088240, which is based upon and claims priority to the Chinese patent application with the filling No. 202111086459.4 filed on Sep. 16, 2021, and entitled "HAIR MODEL RENDERING METHOD AND APPARATUS, ELECTRONIC DEVICE, AND STORAGE MEDIUM", the entire contents of both of which are incorporated herein by reference for all purposes.

TECHNICAL FIELD

The present disclosure relates to the technical field of software and is directed to a hair model rendering method (i.e., a method of hair model rendering) and an apparatus (i.e., a device), an electronic device (i.e., electronic system), and storage medium.

BACKGROUND

With the development of computer technology, hair simulations based on point-line models are appearing more frequently in games. Rendering methods based on hair point-line simulations produce more realistic results than traditional methods, and the rendering of each individual line representing a hair is more delicate and refined. Since the number of hairs in a game is usually very large, in some cases up to or greater than 10,000 individually rendered hairs, with each hair line having 20 to 30 hair nodes, the efficiency of the simulation is extremely demanding, and the performance bottleneck of GPU simulation is often limited by video memory access.

SUMMARY

A method for rendering a hair model can include: obtaining hair data of the hair model and storing the hair data in a video memory of a graphics processor, where the hair data includes a plurality of hairline data groups, each hairline data group includes hairline data, the hairline data includes hair node data and the hair node data constitutes a hairline; configuring a stream processor unit corresponding to each hairline data group, where the stream processor unit includes a thread; loading current to-be-processed hair node data in corresponding hairline data and linked hair node data associated with the to-be-processed hair node data, to a register of the graphics processor via the thread; determining a set of parameter-node position solving algorithms corresponding to the to-be-processed hair node data, where the set of parameter-node position solving algorithms includes at least two node-position solving algorithms; solving a position by a current node-position solving algorithm and a corresponding parameter node, where the parameter node is the current to-be-processed hair node data or the linked hair node data; saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position algorithms or a node-position solving algorithm group corresponding to other hair node data in the hairline data.

An electronic system can include a processor and a memory, the memory storing computer-executable instructions capable of being executed by the processor, where the processor executes the computer-executable instructions to implement a method for rendering a hair model, the method including: obtaining hair data of the hair model and storing the hair data in a video memory of a graphics processor, where the hair data includes a plurality of hairline data groups, each hairline data group includes hairline data, the hairline data includes hair node data and the hair node data constitutes a hairline; configuring a stream processor unit corresponding to each hairline data group, where the stream processor unit includes a thread; loading current to-be-processed hair node data in corresponding hairline data and linked hair node data associated with the to-be-processed hair node data, to a register of the graphics processor via the thread; determining a set of parameter-node position solving algorithms corresponding to the to-be-processed hair node data, where the set of parameter-node position solving algorithms includes at least two node-position solving algorithms; solving a position by a current node-position solving algorithm and a corresponding parameter node, where the parameter node is the current to-be-processed hair node data or the linked hair node data; saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position algorithms or a node-position solving algorithm group corresponding to other hair node data in the hairline data.

A non-transitory computer-readable storage medium, where the non-transitory computer-readable storage medium stores computer-executable instructions, when invoked and executed by a processor, the computer-executable instructions prompt the processor to implement a method for rendering a hair model, including: obtaining hair data of the hair model and storing the hair data in a video memory of a graphics processor, where the hair data includes a plurality of hairline data groups, each hairline data group includes hairline data, the hairline data includes hair node data and the hair node data constitutes a hairline; configuring a stream processor unit corresponding to each hairline data group, where the stream processor unit includes a thread; loading current to-be-processed hair node data in corresponding hairline data and linked hair node data associated with the to-be-processed hair node data, to a register of the graphics processor via the thread; determining a set of parameter-node position solving algorithms corresponding to the to-be-processed hair node data, where the set of parameter-node position solving algorithms includes at least two node-position solving algorithms; solving a position by a current node-position solving algorithm and a corresponding parameter node, where the parameter node is the current to-be-processed hair node data or the linked hair node data; saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position algorithms or a node-position solving algorithm group corresponding to other hair node data in the hairline data.

BRIEF DESCRIPTION OF DRAWINGS

In order to more clearly illustrate the specific embodiments of the present disclosure or the technical solution in the prior art, the drawings required to be used in the description of the specific embodiment or prior art will be briefly introduced as follows. The accompanying drawings illustrate a number of example implementations and are a part of the specification. Together with the following description, these drawings demonstrate and explain various principles of the present disclosure.

FIG. 1 is a flowchart of a method of hair model rendering provided by one or more embodiments of the present disclosure;

DETAILED DESCRIPTION

Figure 2:
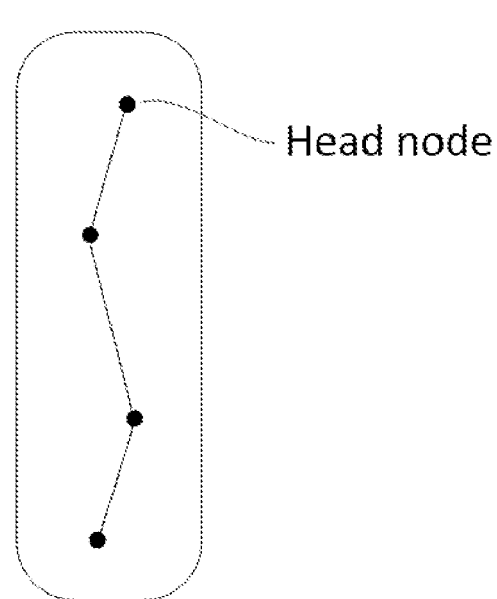
FIG. 2 is a schematic diagram of a hairline and hair nodes provided by one or more embodiments of the present disclosure.

The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, to perform a particular function.

In the process of hair simulation, a GPU (graphics processing unit) is usually used to accelerate the calculation process. A GPU is a typical parallel computing architecture of SIMD (single instruction multiple data), so methods to organize computing data and determine what data are processed in parallel often greatly affects algorithm design and performance.

Most of the GPU solving methods for hairs are of two types: one type is to solve each hair node in parallel and complete the solution by the Jacobi iteration method. The second type is the parallel solution for "hair-node pair", i.e., the parallel Gauss-Seidel solution for the node pair constraint (Constraint).

The first type of solving method mentioned above, which calculates parallel solutions for each hair node, is high in the degree of parallelism but slow in convergence rate and requires more GPU memory for the overhead of reading and writing data. The second type of solution method mentioned above aims at the parallel solution of "hair-node pair". Although the convergence is fast, this method also requires a significant amount of memory for the overhead of reading and writing data, thus affecting the efficiency.

In video game scenes, it is often necessary to perform simulation rendering on the virtual character's hair to make the image of the game character more realistic. At present, the GPU solving methods for hairs are mainly of two types: the first type is to solve each hair node in parallel and complete the solution by Jacobi iteration. Although the degree of parallelism is high in this approach, the convergence rate is slow, which requires more GPU video memory for the overhead of reading and writing. The second type is the parallel solution for "hair node pair", i.e., the parallel Gauss-Seidel solution for the node pair constraints (Constraint), which is fast in convergence rate but also requires a significant amount of video memory for the overhead of reading and writing.

For example, one HairStrand (hair) can consist of four HairNodes (hair nodes), where the HairNodes are denoted as Node1, Node2, Node3, and Node4, respectively. In order to be able to connect the hair nodes with each other, it is usually necessary to directly perform a Distance constraint solution on the nodes. For example, the hair contains three constraints, denoted as Constraint1 (Node1, Node2), Constraint2 (Node2, Node3) and Constraint3 (Node3, Node4). When solving each constraint, it is necessary to read the relevant Node. For example, Constraint1 needs to read Node1 and Node2. After the solution is completed, it is necessary to save the results of Node1 and Node2. When performing the constraint solution on Constraint2 next time, it is necessary to read Node2 and Node3, and so on. This method greatly increases the overhead of reading and writing of GPU video memory, thus affecting the hair rendering efficiency.

In view of this, embodiments of the present disclosure provide a hair model rendering method, device, electronic system, and storage medium, which can reduce the overhead of reading and writing of GPU video memory during hair rendering.

For the purpose of understanding the embodiment, the hair rendering method in embodiment of the present disclosure is first described as follows.

In order to reduce the overhead of reading and writing of GPU video memory during hair rendering, the embodiment of the present disclosure provides a method of hair model rendering, applied to the GPU, as shown in FIG. 1, which specifically includes the following steps.

Step S102: obtaining hair data of the hair model and storing it in a video memory of a graphics processor, where the hair data consists of a plurality of hairline data groups, the hairline data groups including at least one hairline data, the hairline data including hair node data constituting hairline.

The hair data of the hair model is usually extremely large in quantity. To improve the efficiency of hair rendering, the hair data acquired by the GPU is the hair data pre-processed by the CPU, and includes a plurality of hairline data groups, where each group includes at least one hairline data. As shown in FIG. 2, one hairline is composed of a series of hair nodes and line data connecting these nodes. A hairline data can hold the connection relationship between hair nodes of this hairline, namely, hair node data, i.e., parameter nodes, which are the nodes containing position information and quality data.

The GPU stores the acquired hair data into the video memory for subsequent processing of the hair data through threads.

Step S104: configuring a corresponding stream processor unit for the hairline data groups, where a stream processor unit includes at least one thread.

In this step, a corresponding stream processor unit, including at least one thread, is configured for the hairline data group. That is to say, the hairline data of one hairline data group are processed by the threads in one stream processor unit, which is more efficient compared to the prior art where the data is processed in the unit of hair node pair.

Step S106: loading a current to-be-processed hair node data in the corresponding hairline data and a linked hair node data associated with the to-be-processed hair node data, to a register of the graphics processor via the thread.

When processing hair data through threads in the stream processor unit, it is first necessary to load the data to-be-processed into the register of the GPU. By loading the data in this way, the method can ensure that, in each iteration, the register stores a current to-be-processed hair node data and a linked hair node data associated with the to-be-processed hair node data.

Generally speaking, the linked hair node data associated with the to-be-processed hair node data may be at least one node data adjacent to the to-be-processed hair node data. In the embodiment of the present disclosure, the linked hair node data associated with the to-be-processed hair node data includes: a previous hair node data and/or a next hair node data corresponding to the to-be-processed hair node data, in the node position order of the hairline data.

Step S108: determining a set of parameter-node position solving algorithms corresponding to the to-be-processed hair node data, where the set of parameter-node position solving algorithm includes at least two node-position solving algorithms.

Specifically, different sets of parameter-node position solving algorithms can be determined according to the node positions corresponding to the to-be-processed hair node data. For example, if the to-be-processed hair node data is the head node data in the hairline data, then its linked hair node data is only the second node data in the hairline data. In this case, since the head node corresponds to an initialized position, no further calculation is required, thus, the determined solution algorithm set is null. However, when the to-be-processed hair node data is not the head node data in the hairline data, it can be determined that multiple node-position solving algorithms arranged in the order of calculation are included in the set of the parameter-node position solving algorithms.

Step S110: solving the position by means of the current node-position solving algorithm and the corresponding parameter node, where the parameter node is the to-be-processed hair node data and/or the linked hair node data.

There is a correspondence between each node-position solving algorithm and node data (i.e., parameter node), according to which the current parameter node corresponding to the current node-position solving algorithm can be determined, and further the current parameter node can be subjected to the position solving by the algorithm, to obtain the current position information corresponding to the current parameter node.

Step S112: when the current node-position solving algorithm completes the position solving based on the current parameter node, if the current parameter node does not belong to the parameter node of other node-position algorithms and/or the node-position solving algorithm group corresponding to other hair node data in the hairline data, saving the hair node data corresponding to the current parameter node to the video memory of the graphics processor.

After completing the above position solving, if the current parameter node does not belong to the parameter node of other node-position algorithms and/or the node-position solving algorithm group corresponding to other hair node data in the hairline data (that is to say, when the parameter node is no longer needed for subsequent solving calculation), the hair node data corresponding to the current parameter node is saved to the video memory of the graphics processor, i.e., the solved position information is saved to the video memory of the graphics processor.

The method of hair model rendering provided by embodiments of the present disclosure includes: firstly, obtaining hair data of the hair model and storing it in a video memory of a graphics processor, where the hair data consists of a plurality of hairline data groups, the hairline data groups including at least one hairline data, the hairline data including hair node data constituting hairline; then, configuring a corresponding stream processor unit for the hairline data groups, where the stream processor unit includes at least one thread; further, loading a current to-be-processed hair node data in the corresponding hairline data and a linked hair node data associated with the to-be-processed hair node data, to a register of the graphics processor via the thread; further, determining a set of parameter-node position solving algorithms corresponding to the to-be-processed hair node data, where the set of parameter-node position solving algorithms includes at least two node-position solving algorithms; and solving the position by means of the current node-position solving algorithm and the corresponding parameter node, where the parameter node is the to-be-processed hair node data and/or the linked hair node data. when the embodiment of the present disclosure performs the position solving: when the current node-position solving algorithm completes the position solving based on the current parameter node, if the current parameter node does not belong to the parameter node of other node-position algorithms and/or the node-position solving algorithm group corresponding to other hair node data in the hairline data (that is, when the current parameter node is no longer needed for subsequent position solving), the hair node data corresponding to the current parameter node is saved to the video memory of the graphics processor. This approach does not require reloading the relevant node data for each algorithm solution, which can greatly reduce the overhead of reading and writing of the video memory of the graphics processor during hair rendering.

In order to improve the simulation efficiency of hair data and the rendering efficiency of hair model, it is necessary to improve the continuity of video memory access of GPU. In the embodiment of the present disclosure, the initial hair data is pre-processed by CPU to achieve higher continuity of video memory access, and the specific process of the initial hair data is as follows.

The initial hair data is obtained and divided according to each group containing a first quantity of hairline data, so as to obtain a plurality of hairline data groups. Generally, every 32 threads in GPU execute the same instruction at the same time, therefore, the first quantity is set to 32 in the embodiment of the present disclosure, which means that every 32 hairline data is divided into one hairline data group.

Moreover, the hairline data corresponding to each of the hairline data groups are arranged in a Zigzag-SOA arrangement order, where the Zigzag-SOA arrangement order includes: according to the arrangement order of hairline identity, orderly arranging the hair node data of the same node identity corresponding to different hairline; and then orderly arranging the hair node data of different node identity, according to the arrangement order of hair node identity.

Since not all hairlines correspond to the same number of hair node data in the actual application, a node-supplement operation is also required to improve the continuity of video memory access, i.e., using each hairline data group as the current group to perform the following steps: checking the maximum value of quantity of hair node data among multiple hairline data in the current group; adding null nodes to the other hairline whose number of hair node data is less than the maximum value, so that the number of hair node data corresponding to each hairline in the current group all reach the maximum value, so as to make the number of every hair node data is consistent across the same hairline data group.

Figure 3:
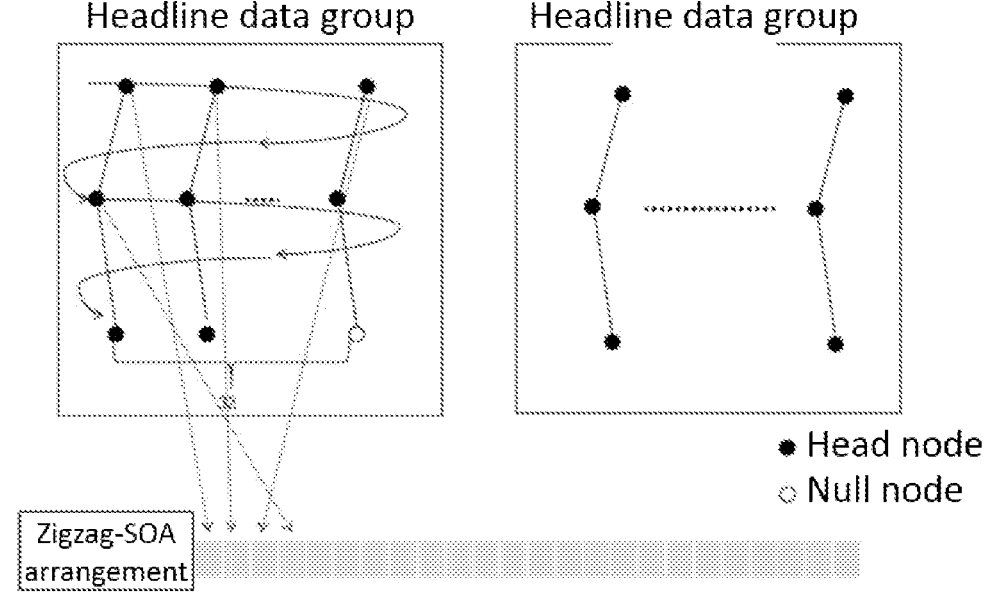
FIG. 3 is a schematic diagram of data pre-processing in hairline data groups provided by one or more embodiments of the present disclosure.

As shown in FIG. 3, the processing process of node data in the hairline data group is as follows: for each hairline data group, obtaining the maximum value of quantity of node data contained in all hairline data in the hairline data group; and adding null nodes (i.e., a hair node with null internal data, as shown in the hollow point in FIG. 3) to all of the hairline data in the hairline data group, whose number of node data is less than the above maximum value, to supplement, such that the number of hair node data in this hairline data also reaches the above maximum value, which ensures that all threads in the same schedule can access the consecutive address of GPU video memory to increase the access hit rate of video memory and improve rendering efficiency.

When configuring a stream processor unit for each hairline data group, the number of hairline data contained in the group may be determined first and then the stream processor unit containing the same number of threads may be allocated. In this way, each thread may process one hairline data, and one stream processor unit may process one hairline data group. Multiple threads simultaneously process the hairline data in the same hairline data group, thereby improving the hair data processing efficiency.

The embodiment of the present disclosure also provides another method of hair model rendering, which is implemented on the basis of the above embodiment. The embodiment focuses on describing the position solving process of a single thread for hairline data. The position solving process for hairline data includes two main steps, one is data loading and the other is solving by algorithms.

Each of the above hairline data includes a plurality of hair node data arranged in the order of node position. Generally speaking, the linked hair node data associated with the to-be-processed hair node data can be at least one node data adjacent to the to-be-processed hair node data, the previous one and the next one adjacent to it, respectively, or the previous two and the next two adjacent to each other, respectively. For example, in the plurality of hair node data arranged in the order of node position, if the to-be-processed node data is the second data, its correspondingly linked hair node data can be the first data and the third data, or can be the first data, the third data and the fourth data, etc. In any case, the data are positioned consecutively. In the embodiment of the present disclosure, the loading process of the current to-be-processed hair node data and the linked hair node data is as follows:

loading the hair node data to the register sequentially by threads in the order of the node positions in the hairline data to ensure that a specified number of hair node data in consecutive positions are stored in the register.

Specifically, whether there are existing hair nodes in the register is checked, where if yes, in the arrangement order of the hair nodes in the hairline data, the next node of the last hair node in the existing hair nodes is determined as a to-be-loaded node, and the hair node data of the to-be-loaded node is loaded into the register; and if no, the specified number of hair node data is sequentially loaded into the register in the arrangement order of the hair nodes in the hairline data.

The above specified number can be greater than 1, and can be set differently according to the actual situation. In the embodiment of the present disclosure, it is illustrated by a specified number of 3. For example, the parameter node (hair node data) included in the hairline data includes Node1, Node2, Node3, Node4, Node5 and Node6. In the arrangement order of the node position of the hairline data (i.e., the arrangement order of six node data mentioned above), three data are successively loaded into the register, where the second data is the current to-be-processed hair node data, and the first data and the third data are the linked hair node data corresponding to the current to-be-processed hair node data. After solving based on the above three node data, the node data that is no longer needed may be returned to the video memory. After performing solving in accordance with the algorithms provided in the embodiment of the present disclosure, the hair node data corresponding to the first data is not needed in subsequent calculation, so the hair node data corresponding to the first data can be returned to the video memory, and the data in the register is deleted. At this time, the second node data and the third node data still remain in the register, and then another hair node data Node4 is added to the register, that is, the node properties in the register during the second round of solving are Node2, Node3 and Node4, and so on, until the node properties in the register are Node 4, Node 5 and Node 6.

In order to clearly illustrate the solving process, the embodiment of the present disclosure begins with an explanatory description of the node-position solving algorithm group.

Figure 4:
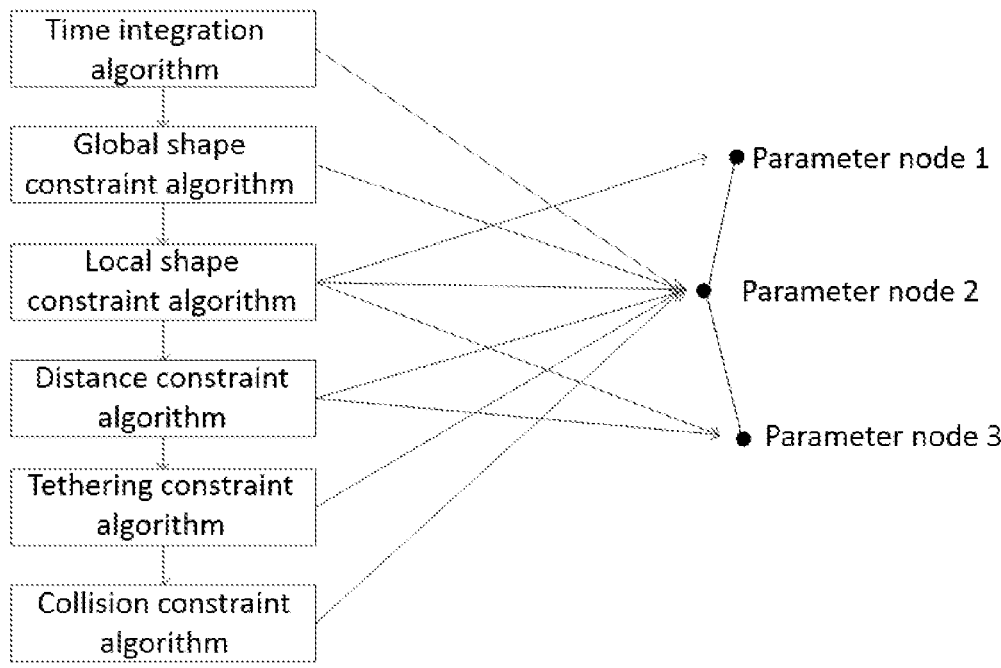
FIG. 4 is a schematic diagram of a hair-node physical constraint solution provided by one or more embodiments of the present disclosure.

In the prior art, the pipeline of the hair-node-position solving algorithms is shown in FIG. 4, one may be divided into six stages as follows: time integration algorithm, global shape constraint algorithm, local shape constraint algorithm, distance constraint algorithm, tethering constraint algorithm, and collision constraint algorithm. The hair node data in hair data is stored in the GPU video memory, and each time a solving is performed by the algorithm, the corresponding node needs to be loaded into the register first, and then the data is stored from the register back to the video memory after the calculation is completed. Before completing each stage, the relevant node data needs to be read, then solved, and finally written into the video memory. The associated node data to be read at each stage is shown in FIG. 4, which indicates the linked hair node data to be accessed at each stage for an algorithm solution, e.g., the local shape constraint algorithm, when solving, requires access to three data: parameter node 1, parameter node 2, and parameter node 3 at the same time.

In embodiments of the present disclosure, the current to-be-processed hair node data and the linked hair node data are three hair node data in consecutive positions, and the determined set of parameter-node position solving algorithm may include a plurality of time integration algorithm, global shape constraint algorithm, local shape constraint algorithm, distance constraint algorithm, tethering constraint algorithm, and collision constraint algorithm, which are arranged in order of computational priority.

Moreover, to further improve the solving efficiency of hair node position, the set of parameter-node position solving algorithms provided in the embodiment of the present disclosure may include that: among the above multiple algorithms, the adjacent algorithms corresponding to the same parameter node are divided into one group, and the following four groups of algorithm are obtained: time integration and global shape constraint algorithm, local shape constraint algorithm, distance constraint algorithm, and tethering constraint and collision constraint algorithm.

Figure 5:
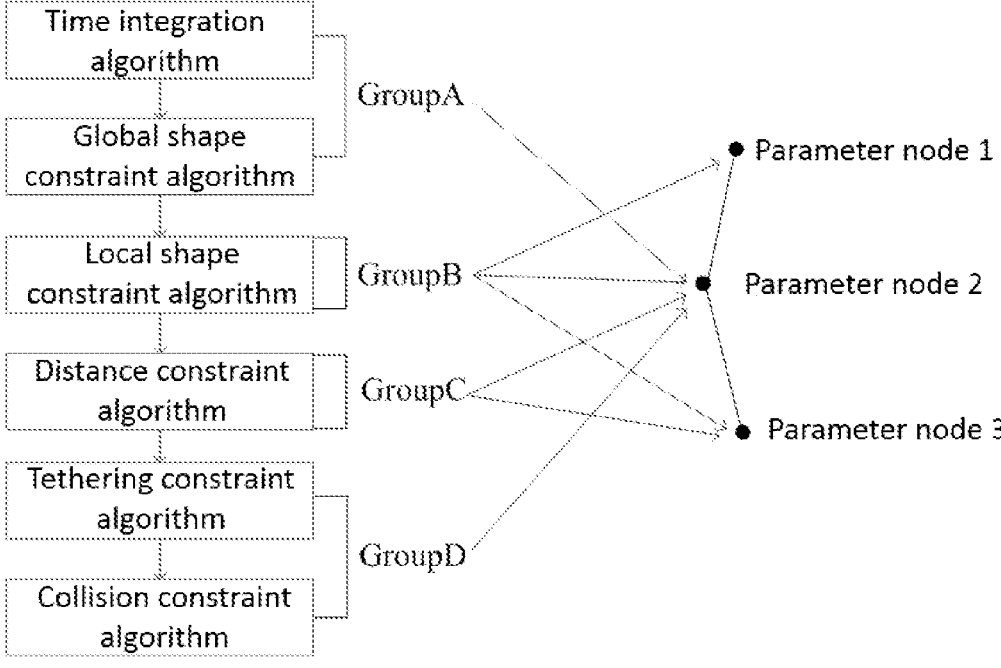
FIG. 5 is a schematic diagram of a node-position solving algorithm group provided by one or more embodiments of the present disclosure.

The following description details an example process of efficient solving for the hair node position based on the above groups of algorithms. As shown in FIG. 5, by combining the above four algorithms into a solving pipeline, the pipelined solving process in the embodiment of the present disclosure may minimize the data transfer amount from the video memory to the register and from the register to the video memory, i.e., minimize the access of video memory.

Figure 6:
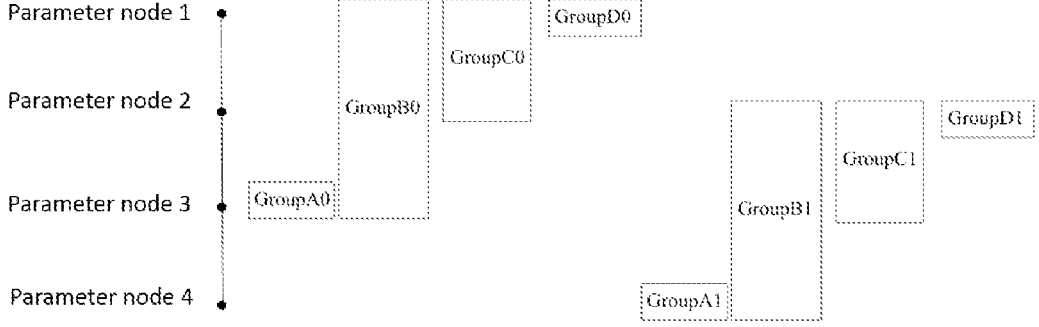
FIG. 6 is a schematic diagram of a pipelined solving sequence provided by one or more embodiments of the present disclosure.

The specific solving process is shown in FIG. 6, where firstly the four solutions of GroupA0, GroupB0, GroupC0 and GroupD0 are performed for parameter node 1, parameter node 2 and parameter node 3, where GroupA0, GroupB0, GroupC0 and GroupD0 correspond to the above four groups of algorithm: time integration and global shape constraint algorithm, local shape constraint algorithm, distance constraint algorithm, and tethering constraint and collision constraint algorithm. If the GroupA0 solution requires parameter node 3, then the node data corresponding to parameter node 3 needs to be loaded into the register. After calculating GroupA0, the parameter node will not be stored in the video memory immediately, but it will be determined whether the parameter node also can be used by other algorithms. The parameter node 3 is stored to the video memory only if it is not used by any one of GroupB0, GroupC0, GroupD0 and algorithm group corresponding to other node. Therefore, each hair node data requires only one time of reading and writing from the video memory. In the figure, after each time solving GroupD, the corresponding node data (position information after solving) is stored in the video memory, and the next node data is loaded into the register from the video memory every time when GroupA needs to be solved.

Specifically, a first hair node data, a second hair node data and a third hair node data are stored in sequential arrangement in the above register; the step of solving the position by the current node-position solving algorithm and the corresponding parameter node includes: if the current node-position solving algorithm is a time integration and global shape constraint algorithm, applying the algorithm to solve the position of the third hair node data to obtain a first position information corresponding to the third hair node data; if the current node-position solving algorithm is a local shape constraint algorithm, applying the algorithm to solve the position for the first position information corresponding to the third hair node data, the first hair node data and the second hair node data, to obtain a second position information corresponding to the third hair node data, the first position information of the first hair node data and the first position information of the second hair node data; if the current node-position solving algorithm is a distance constraint algorithm, applying the algorithm to solve the position for the first position information of the first hair node data and the first position information of the second hair node data, to obtain a second position information of the first hair node data, and a second position information of the second hair node data; and if the current node-position solving algorithm is a tethering constraint and collision constraint algorithm, applying the algorithm to solve the position of the second position information of the first hair node data to obtain a third position information of the first hair node data.

If the above third hair node data is the last hair node data of the hairline data, the step of solving the position by the current node-position solving algorithm and the corresponding parameter node further includes: if the current node-position solving algorithm is a distance constraint algorithm, applying the algorithm to solve the position for the second position information of the second hair node data and the second position information of the third hair node data to obtain a third position information of the second hair node data, and a third position information of the third hair node data; and if the current node-position solving algorithm is a tethering constraint and collision constraint algorithm, applying the algorithm to solve the position for the third position information of the second hair node data and the third position information of the third hair node data to obtain a fourth position information of the second hair node data and a fourth position information of the third hair node data.

A specific example of the entire process of hair model rendering is listed below.

The data preparation process on the CPU side is as follows:

reading the initial hair data of the hair model to be rendered;

grouping the initial hair data by every 32 hairline data to obtain a plurality of hairline data groups;

processing the data in each hairline data group separately;

obtaining the maximum value of quantity of hair node data contained in all hairline data in the hairline data group; and adding null data nodes to all of the hairline data in the hairline data group, whose number of node data is less than the maximum value, to supplement, such that the number of data reaches the maximum value; and performing Zigzag-SOA data layout for the hairline data in the processed hairline data groups.

The computer shader is used at the GPU side to simulate hair movement in real time, where each stream processor unit can simulate one hairline data group, and each thread processes one hairline data; and each thread can read the hair node data in the hairline data to be processed according to its own ID, i.e. the parameter node. The specific solving process of each thread is as follows:

loading the first parameter node onto the register, which is named Node0, and loading the second parameter node onto the register, which is named Node1;

loading the next parameter node to the register, which is named Node2, solving for Node2 via GroupA;

solving for Node0, Node1 and Node2 via GroupB;

solving for Node® and Node1 via GroupC;

solving for Node® via GroupD;

storing Node® to GPU video memory;

assigning Node1 to Node® and assigning Node2 to Node1, if Node2 is the last parameter node of the hairline data, then performing step 9, otherwise repeating step 3;

solving for Node® and Node1 via GroupC;

solving for Node® via GroupD, and storing Node® on the GPU video memory; and solving for Node1 via GroupD and storing Node1 on the GPU video memory.

Figure 7:
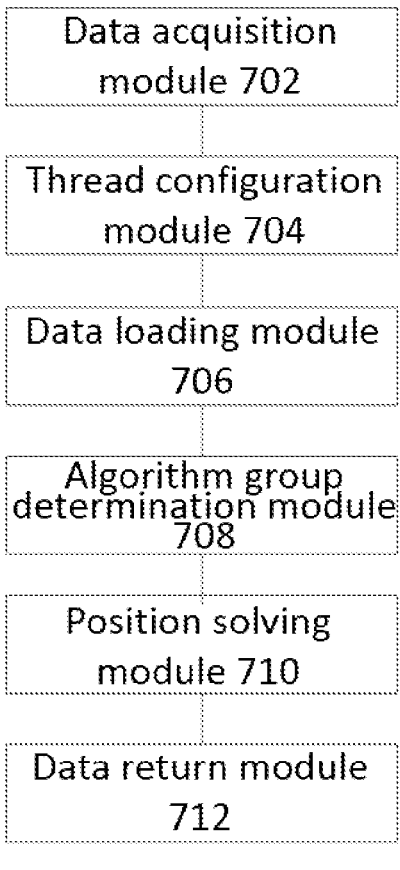
FIG. 7 is a block diagram of the structure of a hair model rendering device provided by one or more embodiments of the present disclosure.

The method of hair model rendering provided by the embodiment of the present disclosure applies the zigzag-SOA to arrange the hairline data for improvement of the hit rate of accessing video memory data during solving by threads in GPU; at the same time, a parallel method that each thread solves one hairline data is proposed, and by grouping the algorithms and using pipelining to load the hair node data (as shown in FIG. 7, the algorithm flow is: GroupA0=>GroupB0=>GroupC0=>GroupD0=>Group-A1=>GroupB1=> . . . and so on), the GPU threads can reduce the number of video memory accesses by several times, thus significantly improving the simulation performance. For the simulation rendering of hair resources of 630,000 nodes, the method provided by the embodiment of the present disclosure may achieve 250-time acceleration relative to a single-core CPU, 40-time acceleration relative to a 10-core CPU, and 3.4-time acceleration relative to a GPU solver based on the Constraint parallel approach.

Based on the above method embodiment, shown as FIG. 7, the embodiment of the present disclosure further provides a device for rendering a hair model, which includes:

a data acquisition module 702, configured to obtain the hair data of the hair model and store it in a video memory of a graphics processor, where the hair data consists of a plurality of hairline data groups, the hairline data groups including at least one hairline data, the hairline data including hair node data constituting hairline; a thread configuration module 704, configured to configure a corresponding stream processor unit for the hairline data groups, where the stream processor unit includes at least one thread; a data loading module 706, configured to load a current to-be-processed hair node data in the corresponding hairline data and a linked hair node data associated with the to-be-processed hair node data, to a register of the graphics processor via the thread; an algorithm group determination module 708, configured to determine a set of parameter-node position solving algorithms corresponding to the to-be-processed hair node data, where the set of parameter-node position solving algorithm includes at least two node-position solving algorithms; a position solving module 710, configured to solve the position by means of the current node-position solving algorithm and the corresponding parameter node, where the parameter node is the to-be-processed hair node data and/or the linked hair node data; and a data return module 712, configured to save the hair node data corresponding to the current parameter node to the video memory of the graphics processor, when the current node-position solving algorithm completes the position solving based on the current parameter node, if the current parameter node does not belong to the parameter node of other node-position algorithms and/or the node-position solving algorithm group corresponding to other hair node data in the hairline data.

The above thread configuration module 704 is also configured to detect a first quantity of hairline data contained in the hairline data group; and configure a stream processor unit containing the first quantity of threads for the hairline data group.

Each of the above hairline data includes a plurality of hair node data arranged in order of node position; and the above data loading module 706 is further configured to load the hair node data to the register sequentially by threads in the order of the node positions in the hairline data to ensure that a specified number of hair node data in consecutive positions are stored in the register.

The above data loading module 706 is also configured to check whether there are existing hair nodes in the register; if yes, in the arrangement order of the hair nodes in the hairline data, determine the next node of the last hair node in the existing hair nodes as a to-be-loaded node, and loading the hair node data of the to-be-loaded node into the register; and if no, load the specified number of hair node data into the register sequentially in the arrangement order of the hair nodes in the hairline data.

The above linked hair node data associated with the to-be-processed hair node data includes: a previous hair node data and/or a next hair node data corresponding to the to-be-processed hair node data, in the node-position order of the hairline data.

The above set of parameter-node position solving algorithm corresponding to the to-be-processed hair node data includes: a plurality of time integration algorithm, global shape constraint algorithm, local shape constraint algorithm, distance constraint algorithm, tethering constraint algorithm, and collision constraint algorithm, which are arranged in order of computational priority; or includes that: among the above multiple algorithms, the adjacent algorithms corresponding to the same parameter node are divided into a group, and the following four groups of algorithm are obtained: time integration and global shape constraint algorithm, local shape constraint algorithm, distance constraint algorithm, and tethering constraint and collision constraint algorithm.

The above position solving module 710 is also configured to: if the current node-position solving algorithm is a time integration and global shape constraint algorithm, applying the algorithm to solve the position of the third hair node data to obtain a first position information corresponding to the third hair node data; if the current node-position solving algorithm is a local shape constraint algorithm, applying the algorithm to solve the position for the first position information corresponding to the third hair node data, the first hair node data and the second hair node data, to obtain a second position information corresponding to the third hair node data, the first position information of the first hair node data and the first position information of the second hair node data; if the current node-position solving algorithm is a distance constraint algorithm, applying the algorithm to solve the position for the first position information of the first hair node data and the first position information of the second hair node data, to obtain a second position information of the first hair node data, and a second position information of the second hair node data; and if the current node-position solving algorithm is a tethering constraint and collision constraint algorithm, applying the algorithm to solve the position of the second position information of the first hair node data to obtain a third position information of the first hair node data.

If the above third hair node data is the last hair node data of the hairline data; the above position solving module 710 is further configured to: if the current node-position solving algorithm is a distance constraint algorithm, applying the algorithm to solve the position for the second position information of the second hair node data and the second position information of the third hair node data to obtain a third position information of the second hair node data, and a third position information of the third hair node data; and if the current node-position solving algorithm is a tethering constraint and collision constraint algorithm, applying the algorithm to solve the position for the third position information of the second hair node data and the third position information of the third hair node data to obtain a fourth position information of the second hair node data and a fourth position information of the third hair node data.

The number of hair nodes is consistent across the hairline data in each of the aforementioned hairline data groups.

The hairline data corresponding to each of the above hairline data groups are arranged in a Zigzag-SOA arrangement order, where the Zigzag-SOA arrangement order includes: according to the arrangement order of hairline identity, orderly arranging the hair node data of the same node identity corresponding to different hairline; and then orderly arranging the hair node data of different node identity, according to the arrangement order of hair node identity.

The hair model rendering device provided by the embodiment of the present disclosure is implemented with the same principles and produces the same technical effects as the aforementioned method embodiment. For a brief description, where the embodiment part of the device is not mentioned, the corresponding contents of the aforementioned embodiment of hair model rendering method can be referred to.

Figure 8:
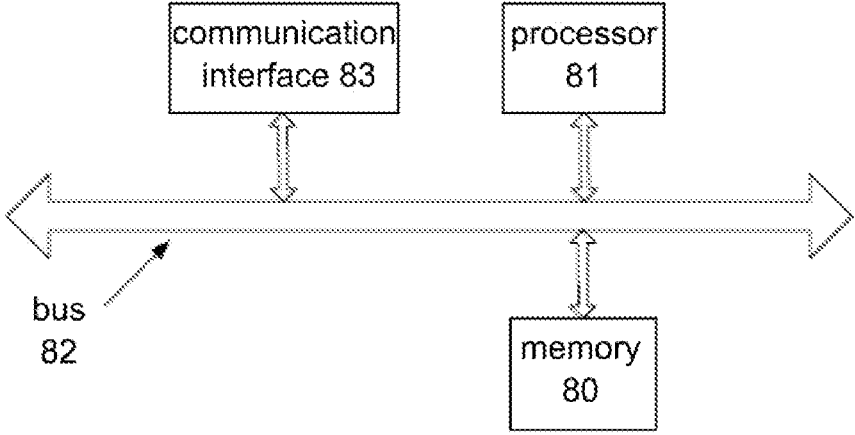
FIG. 8 is a schematic diagram of the structure of an example electronic system provided by one or more embodiments of the present disclosure.

The embodiment of the present disclosure also provides an electronic system, as shown in FIG. 8, a schematic diagram of the structure of the electronic system, where the electronic system includes a processor 81 and a memory 80, the memory 80 storing computer-executable instructions capable of being executed by the processor 81, the processor 81 executing the computer-executable instructions to implement a method including the steps of: obtaining hair data of the hair model and storing it in a video memory of a graphics processor, where the hair data consists of a plurality of hairline data groups, the hairline data groups including at least one hairline data, the hairline data including hair node data constituting hairline; configuring a corresponding stream processor unit for the hairline data groups, where the stream processor unit includes at least one thread; loading a current to-be-processed hair node data in the corresponding hairline data and a linked hair node data associated with the to-be-processed hair node data, to a register of the graphics processor via the thread; determining a set of parameter-node position solving algorithms corresponding to the to-be-processed hair node data, where the set of parameter-node position solving algorithms includes at least two node-position solving algorithms; solving the position by means of the current node-position solving algorithm and the corresponding parameter node, where the parameter node is the to-be-processed hair node data and/or the linked hair node data; and when the current node-position solving algorithm completes the position solving based on the current parameter node, if the current parameter node does not belong to the parameter node of other node-position algorithms and/or the node-position solving algorithm group corresponding to other hair node data in the hairline data, saving the hair node data corresponding to the current parameter node to the video memory of the graphics processor.

Further, the above step of configuring a corresponding stream processor unit for the hairline data group includes: detecting a first quantity of hairline data contained in the hairline data group; and configuring a stream processor unit containing the first quantity of threads for the hairline data group.

Further, each of the above hairline data includes a plurality of hair node data arranged in the order of node positions; the step of loading a current to-be-processed hair node data in the corresponding hairline data and a linked hair node data associated with the to-be-processed hair node data, to a register of the graphics processor via the thread, includes: loading the hair node data to the register sequentially by threads in the order of the node positions in the hairline data to ensure that a specified number of hair node data in consecutive positions are stored in the register.

Further, the above step of loading the hair node data to the register sequentially by threads in the order of the node positions in the hairline data to ensure that a specified number of hair node data in consecutive positions are stored in the register includes: checking whether there are existing hair nodes in the register, if yes, determining the next node of the last hair node in the existing hair nodes as a to-be-loaded node, and loading the hair node data of the to-be-loaded node into the register in the arrangement order of the hair nodes in the hairline data; and if no, loading the specified number of hair node data into the register sequentially in the arrangement order of the hair nodes in the hairline data.

Further, the above linked hair node data associated with the to-be-processed hair node data includes: a previous hair node data and/or a next hair node data corresponding to the to-be-processed hair node data, in the node-position order of the hairline data.

Further, the above set of parameter-node position solving algorithms corresponding to the to-be-processed hair node data includes: a plurality of time integration algorithm, global shape constraint algorithm, local shape constraint algorithm, distance constraint algorithm, tethering constraint algorithm, and collision constraint algorithm, which are arranged in order of computational priority; or includes that: among the above multiple algorithms, the adjacent algorithms corresponding to the same parameter node are divided into a group, and the following four groups of algorithm are obtained: time integration and global shape constraint algorithm, local shape constraint algorithm, distance constraint algorithm, and tethering constraint and collision constraint algorithm.

Further, a first hair node data, a second hair node data and a third hair node data are stored in sequential arrangement in the above register; the step of solving the position by the current node-position solving algorithm and the corresponding parameter node includes: if the current node-position solving algorithm is a time integration and global shape constraint algorithm, applying the algorithm to solve the position of the third hair node data to obtain a first position information corresponding to the third hair node data; if the current node-position solving algorithm is a local shape constraint algorithm, applying the algorithm to solve the position of the first position information corresponding to the third hair node data, the first hair node data and the second hair node data, to obtain a second position information corresponding to the third hair node data, the first position information of the first hair node data and the first position information of the second hair node data; if the current node-position solving algorithm is a distance constraint algorithm, applying the algorithm to solve the position of the first position information of the first hair node data and the first position information of the second hair node data, to obtain a second position information of the first hair node data, and a second position information of the second hair node data; and if the current node-position solving algorithm is a tethering constraint and collision constraint algorithm, applying the algorithm to solve the position of the second position information of the first hair node data to obtain a third position information corresponding to the first hair node data.

Further, if the above third hair node data is the last hair node data of the hairline data, the step of solving the position by the current node-position solving algorithm and the corresponding parameter node further includes: if the current node-position solving algorithm is a distance constraint algorithm, applying the algorithm to solve the position of the second position information of the second hair node data and the second position information of the third hair node data to obtain a third position information of the second hair node data, and a third position information of the third hair node data; and if the current node-position solving algorithm is a tethering constraint and collision constraint algorithm, applying the algorithm to solve the position of the third position information of the second hair node data and the third position information of the third hair node data to obtain a fourth position information of the second hair node data and a fourth position information of the third hair node data.

Further, the number of hair nodes is consistent across the hairline data in each of the aforementioned hairline data groups.

Further, the hairline data corresponding to each of the above hairline data groups are arranged in a Zigzag-SOA arrangement order, where the Zigzag-SOA arrangement order includes: according to the arrangement order of hairline identity, orderly arranging the hair node data of the same node identity corresponding to different hairline; and then orderly arranging the hair node data of different node identity sequentially, according to the arrangement order of hair node identity.

The specific embodiment contents of the operation method in this embodiment are also applicable to the embodiment contents of the aforementioned method of hair model rendering, so they are not repeated here.

The electronic system, provided in the embodiment of the present disclosure, does not require reloading the relevant node data for each algorithm solution, which can greatly reduce the overhead of reading and writing of the video memory of the graphics processor during hair rendering.

In the embodiment illustrated in FIG. 8, the electronic system further includes a bus 82 and a communication interface 83, where the processor 81, the communication interface 83, and the memory 80 are connected via the bus 82.

The memory 80 may contain high-speed Random Access Memory (RAM) and may also include non-volatile memory, such as at least one disk memory. The communication connection between the system network element and at least one other network element is achieved through at least one communication interface 83 (which may be wired or wireless), which may use the Internet, WAN, local network, metropolitan network, etc. The bus 82 can be an ISA (Industry Standard Architecture) bus, a PCI (Peripheral Component Interconnect) bus or an EISA (Extended Industry Standard Architecture) bus and so on. The bus 82 can be divided into address bus, data bus, control bus, etc. For ease of representation, only one bidirectional arrow is used in FIG. 8, but it does not indicate that there is only one bus or one type of bus.

The embodiment of the present disclosure also provides a non-transitory computer-readable storage medium, where the non-transitory computer-readable storage medium stores computer-executable instructions, when invoked and executed by a processor, the computer-executable instructions prompt the processor to implement the method including steps described as follows: obtaining hair data of the hair model and storing it in a video memory of a graphics processor, where the hair data consists of a plurality of hairline data groups, the hairline data groups including at least one hairline data, the hairline data including hair node data constituting hairline; configuring a corresponding stream processor unit for the hairline data groups, where the stream processor unit includes at least one thread; loading a current to-be-processed hair node data in the corresponding hairline data and a linked hair node data associated with the to-be-processed hair node data, to a register of the graphics processor via the thread; determining a set of parameter-node position solving algorithms corresponding to the to-be-processed hair node data, where the set of parameter-node position solving algorithms includes at least two node-position solving algorithms; solving the position by means of the current node-position solving algorithm and the corresponding parameter node, where the parameter node is the to-be-processed hair node data and/or the linked hair node data; and when the current node-position solving algorithm completes the position solving based on the current parameter node, if the current parameter node does not belong to the parameter node of other node-position algorithms and/or the node-position solving algorithm group corresponding to other hair node data in the hairline data, saving the hair node data corresponding to the current parameter node to the video memory of the graphics processor.

Further, the above step of configuring a corresponding stream processor unit for the hairline data group includes: detecting a first quantity of hairline data contained in the hairline data group; and configuring a stream processor unit containing the first quantity of threads for the hairline data group.

Further, each of the above hairline data includes a plurality of hair node data arranged in the order of node positions; the step of loading a current to-be-processed hair node data in the corresponding hairline data and a linked hair node data associated with the to-be-processed hair node data, to a register of the graphics processor via the thread includes: loading the hair node data to the register sequentially by threads in the order of the node positions in the hairline data to ensure that a specified number of hair node data in consecutive positions are stored in the register.

Further, the above step of loading the hair node data to the register sequentially by threads in the order of the node positions in the hairline data to ensure that a specified number of hair node data in consecutive positions are stored in the register includes: checking whether there are existing hair nodes in the register, if yes, determining the next node of the last hair node in the existing hair nodes as a to-be-loaded node, and loading the hair node data of the to-be-loaded node into the register in the arrangement order of the hair nodes in the hairline data; and if no, loading the specified number of hair node data into the register sequentially in the arrangement order of the hair nodes in the hairline data.

Further, the above linked hair node data associated with the to-be-processed hair node data includes: a previous hair node data and/or a next hair node data corresponding to the to-be-processed hair node data, in the node-position order of the hairline data.

Further, the above set of parameter-node position solving algorithms corresponding to the to-be-processed hair node data includes: a plurality of time integration algorithm, global shape constraint algorithm, local shape constraint algorithm, distance constraint algorithm, tethering constraint algorithm, and collision constraint algorithm, which are arranged in order of computational priority; or includes that: among the above multiple algorithms, the adjacent algorithms corresponding to the same parameter node are divided into a group, and the following four groups of algorithm are obtained: time integration and global shape constraint algorithm, local shape constraint algorithm, distance constraint algorithm, and tethering constraint and collision constraint algorithm.

Further, a first hair node data, a second hair node data and a third hair node data are stored in sequential arrangement in the above register; the step of solving the position by the current node-position solving algorithm and the corresponding parameter node includes: if the current node-position solving algorithm is a time integration and global shape constraint algorithm, applying the algorithm to solve the position of the third hair node data to obtain a first position information corresponding to the third hair node data; if the current node-position solving algorithm is a local shape constraint algorithm, applying the algorithm to solve the position of the first position information corresponding to the third hair node data, the first hair node data and the second hair node data, to obtain a second position information corresponding to the third hair node data, the first position information of the first hair node data and the first position information of the second hair node data; if the current node-position solving algorithm is a distance constraint algorithm, applying the algorithm to solve the position of the first position information of the first hair node data and the first position information of the second hair node data, to obtain a second position information of the first hair node data, and a second position information of the second hair node data; and if the current node-position solving algorithm is a tethering constraint and collision constraint algorithm, applying the algorithm to solve the position of the second position information of the first hair node data to obtain a third position information corresponding to the first hair node data.

Further, if the above third hair node data is the last hair node data of the hairline data, the step of solving the position by the current node-position solving algorithm and the corresponding parameter node further includes: if the current node-position solving algorithm is a distance constraint algorithm, applying the algorithm to solve the position of the second position information of the second hair node data and the second position information of the third hair node data to obtain a third position information of the second hair node data, and a third position information of the third hair node data; and if the current node-position solving algorithm is a tethering constraint and collision constraint algorithm, applying the algorithm to solve the position of the third position information of the second hair node data and the third position information of the third hair node data to obtain a fourth position information of the second hair node data and a fourth position information of the third hair node data.

Further, the number of hair nodes is consistent across the hairline data in each of the aforementioned hairline data groups.

Further, the hairline data corresponding to each of the above hairline data groups are arranged in a Zigzag-SOA arrangement order, where the Zigzag-SOA arrangement order includes: according to the arrangement order of hairline identity, orderly arranging the hair node data of the same node identity corresponding to different hairline; and then orderly arranging the hair node data of different node identity sequentially, according to the arrangement order of hair node identity.

The specific embodiment contents of the operation method in this embodiment are also applicable to the embodiment contents of the aforementioned method of hair model rendering, so they are not repeated here.

The non-transitory computer-readable storage medium, provided in the embodiment of the present disclosure, does not require reloading the relevant node data for each algorithm solution, which can greatly reduce the overhead of reading and writing of the video memory of the graphics processor during hair rendering.

The computer program product of the method, device, and electronic system for rendering hair model provided by the embodiment of the present disclosure includes a computer readable storage medium on which program code is stored, where the program code includes instructions that can be used to perform the method described in the previous method embodiment, the specific implementation of which can be found in the method embodiments and will not be repeated herein.

The method of hair model rendering, device, electronic system and storage medium provided by embodiments of the present disclosure include firstly, obtaining hair data of the hair model and storing it in a video memory of a graphics processor, where the hair data consists of a plurality of hairline data groups, the hairline data groups including at least one hairline data, the hairline data including hair node data constituting hairline; then, configuring a corresponding stream processor unit for the hairline data groups, where the stream processor unit includes at least one thread; further, loading a current to-be-processed hair node data in the corresponding hairline data and a linked hair node data associated with the to-be-processed hair node data, to a register of the graphics processor via the thread; further, determining a set of parameter-node position solving algorithms corresponding to the to-be-processed hair node data, where the set of parameter-node position solving algorithms includes at least two node-position solving algorithms; and solving the position by means of the current node-position solving algorithm and the corresponding parameter node, where the parameter node is the to-be-processed hair node data and/or the linked hair node data. When the embodiment of the present disclosure performs the position solving: when the current node-position solving algorithm completes the position solving based on the current parameter node, if the current parameter node does not belong to the parameter node of other node-position algorithms and/or the node-position solving algorithm group corresponding to other hair node data in the hairline data (that is to say, when the current parameter node is no longer needed for subsequent position solving), the hair node data corresponding to the current parameter node is saved to the graphics processor's video memory. This approach does not require reloading the relevant node data when performing each algorithm solution, which can greatly reduce the overhead of reading and writing of the video memory of the graphics processor during hair rendering.

Unless otherwise specified, the relative steps, numerical expressions, and values of the components and steps set forth in the embodiment do not limit the scope of the present disclosure.

When the function is implemented in the form of a software functional unit and sold or used as an independent product, the function may be stored in a processor-executed non-volatile computer-readable storage medium. Based on such an understanding, the technical solutions of the present disclosure essentially, or the part contributing to the prior art, or a part of the technical solutions may be implemented in the form of a software product. The computer software product is stored in a storage medium and includes several instructions for instructing a computer device (which may be a personal computer, a server, or a network device) to perform all or a part of steps of the method described in the embodiment of the present disclosure. Moreover, the above-mentioned storage medium includes various media capable of storing program codes, such as a USB flash disk, a mobile hard disk, a read-only memory (ROM), a random access memory (RAM), a magnetic disk, an optical disk, or the like.

In descriptions of the present disclosure, it should be noted that, directions or positional relationships indicated by terms "center", "upper", "lower", "left", "right", "vertical", "horizontal", "inner", "outer", etc. are based on orientations or positional relationships shown in the drawings, and they are used only for describing the present disclosure and for description simplicity, but do not indicate or imply that an indicated apparatus or element must be in a specific orientation or be constructed and operated in a specific orientation. Therefore, it cannot be understood as a limitation on the present disclosure. In addition, the terms such as "first", "second" and "third" are only used for purposes of description and are not intended to indicate or imply relative importance.

Finally, it should be noted that the above embodiments are only specific implementations of the present disclosure and used to illustrate the technical solutions of the present disclosure, but not to limit them, and the protection scope of the present disclosure is not limited thereto; although the present disclosure is described in detail with reference to the above embodiments, those having ordinary skill in the art should understand that any person skilled in the art still can modify technical solutions recited in the aforesaid embodiments or easily envisage changes or equivalently replace partial technical features therein within the technical scope of the present disclosure; these modifications, changes or substitutions do not make essence of corresponding technical solutions depart from the spirit and scope of the technical solutions of the embodiments of the present disclosure, and are intended to be covered by the protection scope of the present disclosure. Therefore, the protection scope of the present disclosure shall be subject to the protection scope of the claims.

What is claimed is:

1. A method for rendering a hair model, comprising:

obtaining hair data of the hair model and storing the hair data in a video memory of a graphics processor, wherein the hair data comprises a plurality of hairline data groups, each hairline data group comprises hairline data, the hairline data comprising hair node data and the hair node data constitutes a hairline;

configuring a stream processor unit corresponding to each hairline data group, wherein the stream processor unit comprises a thread;

loading, via the thread to a register of the graphics processor, current to-be-processed hair node data in corresponding hairline data and linked hair node data associated with the current to-be-processed hair node data;

determining a set of parameter-node position solving algorithms corresponding to the current to-be-processed hair node data, wherein the set of parameter-node position solving algorithms comprises at least two node-position solving algorithms;

solving a position by a current node-position solving algorithm and a corresponding parameter node, wherein the corresponding parameter node is the current to-be-processed hair node data or the linked hair node data;

saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position solving algorithms or a node-position solving algorithm group corresponding to other hair node data in the hairline data, wherein:

each hairline data comprises a plurality of hair node data arranged in an order of node positions, and the loading the current to-be-processed hair node data comprises loading the plurality of hair node data to the register sequentially via the thread in the order of the node positions in the hairline data such that a specified number of hair node data in consecutive positions are stored in the register.

2. The method according to claim 1, wherein configuring the stream processor unit corresponding to each hairline data group comprises:

detecting a first quantity of the hairline data contained in a hairline data group;

configuring a stream processor unit comprising the first quantity of threads for the hairline data group.

3. The method according to claim 1, wherein loading the plurality of hair node data to the register sequentially via the thread in the order of the node positions in the hairline data comprises:

checking whether existing hair nodes exist in the register;

in response to determining that the existing hair nodes exist in the register, determining next node of last hair node in the existing hair nodes as a to-be-loaded node, and loading hair node data of the to-be-loaded node into the register, in an arrangement order of hair nodes in the hairline data; and in response to determining that the existing hair nodes do not exist in the register, loading the specified number of hair node data into the register sequentially in the arrangement order of the hair nodes in the hairline data.

4. The method according to claim 1, wherein the linked hair node data associated with the to-be-processed hair node data comprises: a previous hair node data or a next hair node data corresponding to the to-be-processed hair node data, in the order of the node positions of the hairline data.

5. The method according to claim 4, wherein the set of parameter-node position solving algorithms corresponding to the to-be-processed hair node data comprises a plurality of algorithms, comprising: time integration algorithm, global shape constraint algorithm, local shape constraint algorithm, distance constraint algorithm, tethering constraint algorithm, and collision constraint algorithm, wherein at least one of:

the plurality of algorithms are arranged in an order of computational sequence; or among the plurality of algorithms, adjacent algorithms corresponding to a same parameter node are divided into a group to groups of algorithms that a grouped by: time integration and global shape constraint algorithm, local shape constraint algorithm, distance constraint algorithm, and tethering constraint and collision constraint algorithm.

6. The method according to claim 5, wherein:

the specified number is three, and a first hair node data, a second hair node data and a third hair node data are loaded in sequential arrangement in the register; and solving the position by the current node-position solving algorithm and the corresponding parameter node comprises:

in response to determining that the current node-position solving algorithm comprises the time integration algorithm and global shape constraint algorithm, applying the current node-position solving algorithm to solve a position of the third hair node data to obtain a first position information corresponding to the third hair node data;

in response to determining that the current node-position solving algorithm comprises the local shape constraint algorithm, applying the current node-position solving algorithm to solve a position of the first position information corresponding to the third hair node data, the first hair node data and the second hair node data, to obtain a second position information corresponding to the third hair node data, a first position information of the first hair node data and a first position information of the second hair node data;

in response to determining that the current node-position solving algorithm comprises the distance constraint algorithm, applying the current node-position solving algorithm to solve a position of the first position information of the first hair node data and the first position information of the second hair node data, to obtain a second position information of the first hair node data and a second position information of the second hair node data; and in response to determining that the current node-position solving algorithm comprises a tethering constraint and collision constraint algorithm, applying the current node-position solving algorithm to solve a position of the second position information of the first hair node data to obtain a third position information of the first hair node data.

7. The method according to claim 6, wherein in response to determining that the third hair node data is a last hair node data of the hairline data, and wherein solving the position by the current node-position solving algorithm and the corresponding parameter node further comprises:

in response to determining that the current node-position solving algorithm comprises a distance constraint algorithm, applying the current node-position solving algorithm to solve a position of the second position information of the second hair node data and the second position information of the third hair node data to obtain a third position information of the second hair node data, and a third position information of the third hair node data; and in response to determining that if the current node-position solving algorithm is comprises a tethering constraint and collision constraint algorithm, applying the current node-position solving algorithm to solve a position of the third position information of the second hair node data and the third position information of the third hair node data to obtain a fourth position information of the second hair node data and a fourth position information of the third hair node data.

8. The method according to claim 1, wherein the specified number of hair nodes data is consistent across the hairline data in each of the plurality of hairline data groups.

9. The method according to claim 8, wherein the hairline data corresponding to each of plurality of the hairline data groups are arranged in a Zigzag-SOA arrangement order, wherein the Zigzag-SOA arrangement order comprises: according to an arrangement order of hairline identity, orderly arranging hair node data of a same node identity corresponding to different hairline; and orderly arranging hair node data of different node identity sequentially, according to an arrangement order of hair node identity.

10. An electronic system, comprising a processor and a memory, the memory storing computer-executable instructions capable of being executed by the processor, wherein the processor executes the computer-executable instructions to implement a method for rendering a hair model, comprising:

obtaining hair data of the hair model and storing the hair data in a video memory of a graphics processor, wherein the hair data comprises a plurality of hairline data groups, each hairline data group comprises hairline data, the hairline data comprises hair node data and the hair node data constitutes a hairline;

configuring a stream processor unit corresponding to each hairline data group, wherein the stream processor unit comprises a thread;

loading, via the thread to a register of the graphics processor, current to-be-processed hair node data in corresponding hairline data and linked hair node data associated with the to-be-processed hair node data;

determining a set of parameter-node position solving algorithms corresponding to the to-be-processed hair node data, wherein the set of parameter-node position solving algorithms comprises at least two node-position solving algorithms;

solving a position by a current node-position solving algorithm and a corresponding parameter node, wherein the parameter node is the current to-be-processed hair node data or the linked hair node data;

saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position solving algorithms or a node-position solving algorithm group corresponding to other hair node data in the hairline data, wherein:

each hairline data comprises a plurality of hair node data arranged in an order of node positions, and the loading the current to-be-processed hair node data comprises loading the plurality of hair node data to the register sequentially via the thread in the order of the node positions in the hairline data such that a specified number of hair node data in consecutive positions are stored in the register.

11. The electronic system according to claim 10, wherein configuring the stream processor unit corresponding to each hairline data group comprises:

detecting a first quantity of the hairline data contained in a hairline data group;

configuring a stream processor unit comprising the first quantity of threads for the hairline data group.

12. The electronic system according to claim 10, wherein each hairline data comprises a plurality of hair node data arranged in an order of node positions; and wherein loading, via the thread to a register of the graphics processor, the current to-be-processed hair node data in corresponding hairline data and linked hair node data associated with the to-be-processed hair node data comprises:

loading the plurality of hair node data to the register sequentially via the thread in the order of the node positions in the hairline data to ensure that a specified number of hair node data in consecutive positions are stored in the register.

13. The electronic system according to claim 12, wherein loading the plurality of hair node data to the register sequentially via the thread in the order of the node positions in the hairline data:

checking whether existing hair nodes exist in the register, in response to determining that the existing hair nodes exist in the register, determining next node of last hair node in the existing hair nodes as a to-be-loaded node, and loading hair node data of the to-be-loaded node into the register, in an arrangement order of hair nodes in the hairline data; and in response to determining that the existing hair nodes do not exist in the register, loading the specified number of hair node data into the register sequentially in the arrangement order of the hair nodes in the hairline data.

14. The electronic system according to claim 12, wherein the linked hair node data associated with the to-be-processed hair node data comprises: a previous hair node data or a next hair node data corresponding to the to-be-processed hair node data, in the order of the node positions of the hairline data.

15. The electronic system according to claim 14, wherein the set of parameter-node position solving algorithms corresponding to the to-be-processed hair node data comprises a plurality of algorithms, comprising: time integration algorithm, global shape constraint algorithm, local shape constraint algorithm, distance constraint algorithm, tethering constraint algorithm, and collision constraint algorithm, wherein:

the plurality of algorithms are arranged in an order of computational sequence; or among the plurality of algorithms, adjacent algorithms corresponding to a same parameter node are divided into a group, and following four groups of algorithm are obtained: time integration and global shape constraint algorithm, local shape constraint algorithm, distance constraint algorithm, and tethering constraint and collision constraint algorithm.

16. The electronic system according to claim 15, wherein the specified number is three, and a first hair node data, a second hair node data and a third hair node data are loaded in sequential arrangement in the register; and wherein solving the position by the current node-position solving algorithm and the corresponding parameter node comprises:

in response to determining that the current node-position solving algorithm comprises the time integration algorithm and global shape constraint algorithm, applying the current node-position solving algorithm to solve a position of the third hair node data to obtain a first position information corresponding to the third hair node data;

in response to determining that the current node-position solving algorithm comprises the local shape constraint algorithm, applying the current node-position solving algorithm to solve a position of the first position information corresponding to the third hair node data, the first hair node data and the second hair node data, to obtain a second position information corresponding to the third hair node data, a first position information of the first hair node data and a first position information of the second hair node data;

in response to determining that the current node-position solving algorithm comprises the distance constraint algorithm, applying the current node-position solving algorithm to solve a position of the first position information of the first hair node data and the first position information of the second hair node data, to obtain a second position information of the first hair node data and a second position information of the second hair node data; and in response to determining that the current node-position solving algorithm comprises a tethering constraint and collision constraint algorithm, applying the current node-position solving algorithm to solve a position of the second position information of the first hair node data to obtain a third position information of the first hair node data.

17. The electronic system according to claim 16, wherein in response to determining that the third hair node data is a last hair node data of the hairline data, and wherein solving the position by the current node-position solving algorithm and the corresponding parameter node further comprises:

in response to determining that the current node-position solving algorithm comprises a distance constraint algorithm, applying the current node-position solving algorithm to solve a position of the second position information of the second hair node data and the second position information of the third hair node data to obtain a third position information of the second hair node data, and a third position information of the third hair node data; and in response to determining that the current node-position solving algorithm comprises a tethering constraint and collision constraint algorithm, applying the current node-position solving algorithm to solve a position of the third position information of the second hair node data and the third position information of the third hair node data to obtain a fourth position information of the second hair node data and a fourth position information of the third hair node data.

18. The electronic system according to claim 10, wherein the number of hair node data is consistent across the hairline data in each of the plurality of hairline data groups.

19. A non-transitory computer-readable storage medium, wherein the non-transitory computer-readable storage medium stores computer-executable instructions, when invoked and executed by a processor, the computer-executable instructions prompt the processor to implement method for rendering a hair model, comprising:

obtaining hair data of the hair model and storing the hair data in a video memory of a graphics processor, wherein the hair data comprises a plurality of hairline data groups, each hairline data group comprises hairline data, the hairline data comprises hair node data and the hair node data constitutes a hairline;

configuring a stream processor unit corresponding to each hairline data group, wherein the stream processor unit comprises a thread;

loading, via the thread to a register of the graphics processor, current to-be-processed hair node data in corresponding hairline data and linked hair node data associated with the to-be-processed hair node data;

determining a set of parameter-node position solving algorithms corresponding to the to-be-processed hair node data, wherein the set of parameter-node position solving algorithms comprises at least two node-position solving algorithms;

solving a position by a current node-position solving algorithm and a corresponding parameter node, wherein the parameter node is the current to-be-processed hair node data or the linked hair node data;

saving hair node data corresponding to a current parameter node to the video memory of the graphics processor, in response to determining that the current node-position solving algorithm completes a position solving based on the current parameter node, and in response to determining that the current parameter node does not belong to a parameter node of other node-position solving algorithms or a node-position solving algorithm group corresponding to other hair node data in the hairline data, wherein:

each hairline data comprises a plurality of hair node data arranged in an order of node positions, and the loading, the current to-be-processed hair node data comprises loading the plurality of hair node data to the register sequentially via the thread in the order of the node positions in the hairline data such that a specified number of hair node data in consecutive positions are stored in the register.

* * * * *